July 18, 1939.   C. N. DEVERALL   2,166,397
EVAPORATIVE COOLER
Filed Feb. 12, 1937   2 Sheets-Sheet 2
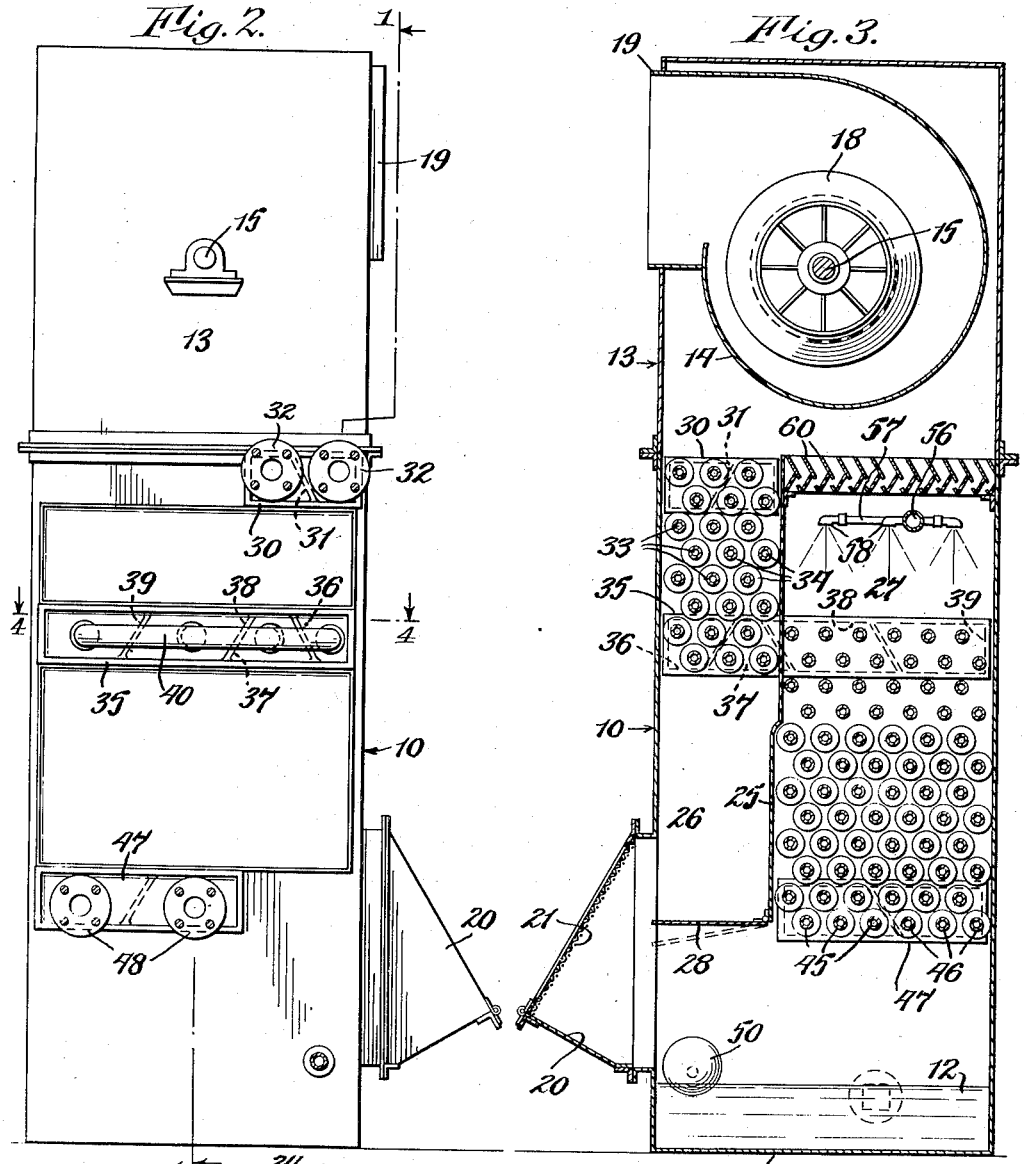
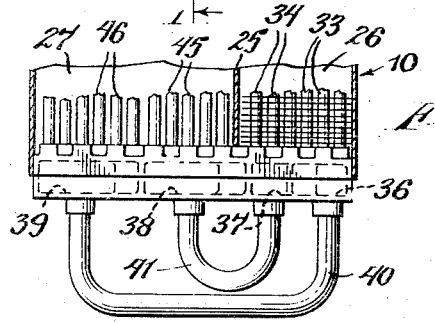

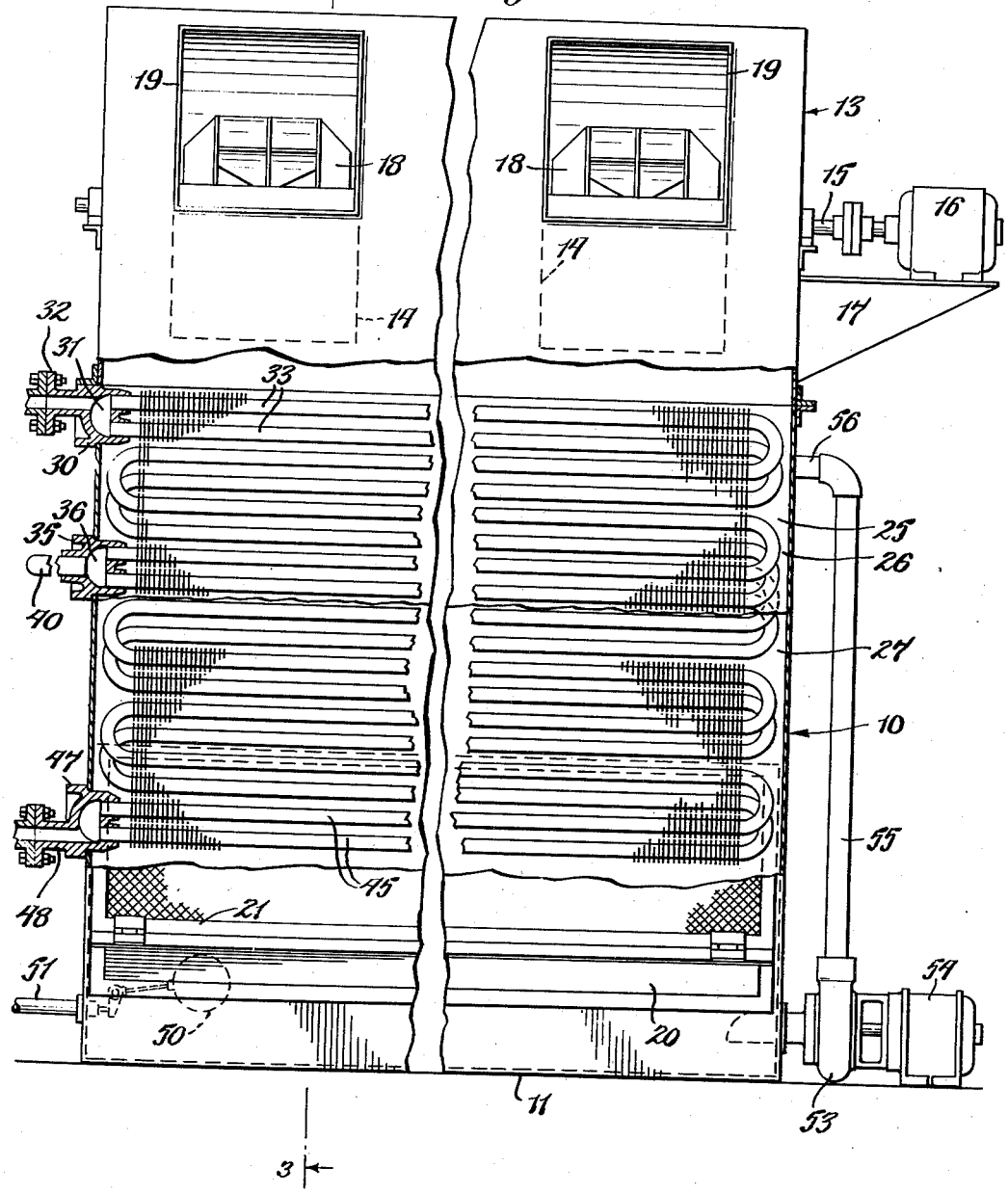

Patented July 18, 1939

REISSUED
OCT 7 1941

2,166,397

UNITED STATES PATENT OFFICE 2,166,397

EVAPORATIVE COOLER

Charles N. Deverall, Buffalo, N. Y., assignor to Niagara Blower Company, New York, N. Y., a corporation of New York Application February 12, 1937, Serial No. 125,471

12 Claims. (Cl. 257—37)

This invention relates to an evaporative cooler and is shown as embodied in a condenser for condensing the compressed gas of a refrigeration system, although it can be employed wherever it is desired to cool a gas or liquid to a point near the wet bulb temperature of the atmosphere.

One of the principal objects of this invention is to provide a cooler for cooling and/or condensing a gas or liquid, such as compressed superheated refrigerant gas, in which the cooling water is recirculated and the cooling effect achieved principally by evaporation of the cooling water on the pipes through which the gas is conducted. By this means an economy is effected in the cost of cooling water and by its use the municipal sewer systems are not overtaxed by the installation of large air conditioning systems which normally require large amounts of cooling water for condensing the compressed refrigerant.

Another object of the present invention is to provide such a cooler which is suitable for use in cooling fluids having a relatively high entering temperature. At temperatures above 115° F. spray water will evaporate rapidly and deposit scale upon the pipes conducting the medium to be cooled. In accordance with the present invention the temperature of the medium to be cooled is first reduced to at or below 115° F. by air cooling before being subjected to evaporative cooling so that any deposit which does occur is so soft as to be immediately washed off the pipes by the sprays.

Another object of the present invention is to provide such a condenser in which the first or air cooling stage merely removes sensible heat from the gas to be condensed to bring it below the point at which a scale would form with evaporative cooling and to remove the balance of the sensible heat and the latent heat in a second stage by evaporative cooling. By this means the preponderance of the heat is removed by evaporative cooling.

Another object of the present invention is to provide an evaporative cooler in which air and water is passed over the pipes through which the medium to be cooled is conducted and in which the air leaving the cooler is not saturated with moisture, but is relatively dry. By this means should it be desired to discharge the air through, say, grillwork over a door, there would be little danger of the moisture condensing on the grillwork and the condensate dripping therefrom.

Another object is to provide an evaporative cooler having a passage containing dry coils and a passage containing wet coils in series with the dry coils in which the relative amounts of air drawn through the two passages can be conveniently adjusted.

Another object is to provide an evaporative cooler unit which is so designed as to be capable of cooling two or more separate fluids.

Another object is to provide a common header for the wet and dry coils.

Another object of the invention is to provide such an evaporative cooler which is extremely compact in construction and efficient in operation and which can be located at any convenient place, the air being discharged by means of a fan through a duct which can be arranged to discharge the air as may be desired.

Another object of the present invention is to provide such a condenser which has a relatively small amount of cooling coils operating at high efficiency and which is comparatively inexpensive in construction.

In the accompanying drawings:

Fig. 1 is a fragmentary vertical, section, taken generally on line 1—1, Fig. 2, and showing parts in elevation.

Fig. 2 is an end elevation thereof.

Fig. 3 is a vertical section, taken on line 3—3, Fig. 1.

Fig. 4 is a fragmentary horizontal section, taken on line 4—4, Fig. 2.

In its general organization the evaporative cooler forming the subject of the present invention consists of a casing through which air is drawn by means of a fan and which is divided into two passages, each passage containing cooling coils, the cooling coils of the two passages being arranged in series. In one of the passages the cooling coils are sprayed with water, the excess water collecting in the bottom of the casing and being recirculated. The fluid to be cooled or condensed is admitted first to the coils arranged in the air passage in which it is cooled below the point at which a scale would form if these coils were sprayed with water. From these coils it is conducted to the coils sprayed with water in the other passage where its temperature is further reduced and the latent heat removed if the cooler is used as a condenser. Means are provided for preventing the escape of entrained moisture and means are also provided for adjusting the proportions of air going through the passages. The headers for the coils are also so constructed and connected with one another as to provide a simple and compact construction and are also preferably so designed that two or more separate streams of fluid can be cooled in the same evaporative cooler at the same time.

The evaporative cooler is shown as comprising a lower casing section 10 of rectangular form, the bottom of which is closed to form a tank or sump 11 which contains a body of water 12. Removably mounted on the section 10 is an upper rectangular section 13, the two sections 10 and 13 being in open communication with one another and the upper section 13 containing a plurality of fan housings 14, the inlets of which are in communication with the interior of the casing 13. A common shaft 15 extends through the several fan housings 14 and is shown as driven by a motor 16 mounted on a bracket 17 at one end of the casing 13. Within each fan housing the shaft 15 carries a fan 18 of any suitable construction, these fans drawing the air from the interior of the casing 10, 13 and discharging it through an outlet 19.

Air is admitted to the lower part of the lower casing section 10 through a side inlet 20 which can be of any suitable construction and is preferably screened as indicated at 21. It will therefore be seen that air is drawn through the inlet 20 up through the casing sections 10 and 13 into the fan housings from which it is discharged through the fan outlets 19. It will be understood that the fan outlets 19 are to be connected to a duct (not shown) through which the air is discharged at any desired place.

A vertical partition 25 is provided within the casing 10, this partition dividing the casing into two passages 26 and 27. The partition 25 preferably extends below the top of the inlet 20 and to the bottom of this partition is preferably hinged a plate 28, this plate being vertically adjustable, as indicated by the full and dotted lines in Fig. 3. It will be seen that by so adjusting the plate 28 the proportions of air admitted to the passages 26 and 27 can be adjusted as desired to secure any desired relative flows through these passages.

Mounted in the upper part of the passage 26 is an inlet header 30 which can be of any suitable construction and is shown as being in the form of a hollow casting having an internal partition 31 which divides the header into two separate chambers. Each of these chambers is provided with an inlet nipple or connection 32. In the form of the invention shown, one of the interior chambers of the inlet header 30 communicates with three serpentine cooling coils or tubes 33 and the other chamber communicates with three similar serpentine cooling coils or tubes 34. These tubes are preferably provided with an extended or fin surface and at their lower ends connect with an intermediate header 35 which extends the full width of the casing 10. This header 35 is preferably in the form of a casting and is provided with internal partitions forming four separate chambers 36, 37, 38 and 39. The tubes 33 communicate with the chamber 36. The tubes 34 communicate with the chamber 37. The chamber 36 is connected by an exterior pipe 40 with the chamber 39 and the chamber 37 is connected by a pipe 41 with the chamber 38.

That part of the intermediate header 35 containing the chambers 38 and 39 is located alongside the passage 27 and six serpentine cooling coils 45 are shown as connecting with the chamber 38, these coils 45 being located within the second passage 27. Similarly, six coils 46 are shown as communicating with the chamber 39, these coils being located in the second passage 27. The lower ends of the coils 45 and 46 connect with an outlet header 47, this header being formed with a central partition to provide two chambers, the coils 45 discharging into one of these chambers and the coils 46 into the other of these chambers. Each of these chambers is provided with an outlet nipple or connection 48. Preferably only the lower part of the bank of coils 45 and 46 in the second passage 27 are provided with an extended or fin surface, the uppermost turns of these coils being left bare, as best shown in Fig. 3.

The water 12 in the bottom of the casing section 10 is maintained at a constant level by a float valve 50 which controls the admission of water from a supply main 51 so that as evaporation takes place the valve 50 will replenish the water supply. The water in the tank 11 is withdrawn by a centrifugal pump 53 driven by a motor 54 and is discharged through a vertical pipe 55 into a horizontal pipe 56 extending lengthwise through the interior of the casing. This pipe 56 carries a suitable number of branch pipes 57 each of which carries a downwardly discharging nozzle 58. The nozzles 58 are arranged above the bank of coils 45 and 46 and in the second passage 27 so that these coils are constantly flushed with water. The excess water from the coils 45 and 46 falls back into the sump 11.

In order to remove any entrained moisture from the air passing upwardly through the second passage 27, eliminator plates 60 are provided, these eliminator plates being arranged across the upper end of the passage 27 and being of such form as to whip the air back and forth and cause any entrained moisture to be deposited on the eliminator plates from which these drip down onto the bank of coils therebelow. The eliminator plates prevent entrained moisture from being carried over to the high temperature coils in the passage 26 and building up a deposit on these coils.

*Operation*

It will be assumed as an example that the evaporative condenser is used to condense the superheated refrigerant gas from the compressor of a refrigeration system and that this superheated refrigerant gas has a temperature of 210° F. and is under 155 lbs. pressure, its condensing temperature therefore being 86° F. It will also be assumed that the wet bulb temperature of the air entering the evaporative condenser is 75° F. and is at, say, a dry bulb temperature of 95° F.

The superheated refrigerant gas enters one of the nipples 32 of the header 30 and passes, say, through the tubes 33 and into the compartment 36 of the header 35. These tubes 33 are fin surfaced and are cooled by the stream of air drawn up through the passage 26, this air having an entering temperature of 95° F. Under the outside temperature of 95° F., it is possible to cool the gas to 100° F. in the coils 33. The amount of surface of the coils 33 is such that with the maximum temperature of the outside air, the gas will be cooled in these coils 33 to a temperature below 115° F. Such cooling under the condition assumed will reduce the gas to a substantially saturated vapor near its condensing temperature. Since the coils in the air passage 26 are dry coils a deposit is not formed upon these coils as would be the case if they were sprayed with water. At the same time only the superheat of the gas is removed in these coils, this superheat constituting only a small part of the total heat to be removed. Under the conditions assumed, a reduction in temperature of the gas from 210° F. to a liquid at 86° F., the total heat to be removed would be 580 B. t. u. per pound. Of this 80 B. t.

u. would be sensible superheat and 500 B. t. u. latent heat.

The partially cooled gas from the chamber 36 at the assumed 100° F., passes through the pipe 40 in the chamber 39 of the same header 35 and from this header enters the six tubes 46 connecting with the outlet header 47. These tubes are sprayed with water from the spray nozzles 58, but since the temperature of the gas has already been reduced below 115° F., the tubes 46 are not heated to a temperature at which the spray water will form a scale on these tubes. It will further be noted that the upper part of the bank of tubes in the pass 27 are unfinned so that if these tubes should rise to a point slightly above 115° F. the bare tubes will be kept washed and free from the slight deposit which might otherwise tend to form. As is well known, tubes, such as the coils 46, when cooled by a flow of air and recirculated spray water assume the wet bulb temperature of the air and in passing through the tubes 46 the refrigerant is therefore cooled to its condensing temperature, or 86° F. under the pressure assumed, the wet bulb temperature being assumed to have been at 75° F. By proper proportioning of surface and sprays, it is possible in the wet coils to reduce the gas temperature to within 4-5° of the wet bulb temperature so that with the assumed outside wet bulb temperature of 75° F., the gas is cooled to about 80° F. It will be understood that a sufficiently high outlet pressure is maintained so that the condensing temperature of the gas is above the most adverse atmospheric wet bulb conditions encountered. The condensed refrigerant from the header 47 is drawn out through the corresponding nipple 48.

The air drawn up through the passage 27 may be substantially saturated. However, the relative humidity of the air coming up the passage 26 is reduced on being heated by the coils 33 and 34. Therefore when the two streams of air are mixed on passing through the fan, the air discharged from the fan has an intermediate relative humidity and is not saturated. As a result of the admixture of the heated air from the passage 26 there is less tendency for condensation in the duct or condensation at the discharge outlet, the latter being highly undesirable where the discharge is above a point where people pass.

It will be noted that with the above operation the bank of dry coils 34 and bank of wet coils 45 were assumed to be not in use. It is obvious that the superheated refrigerant gas from another system can be cooled and condensed in these coils or that all of the coils can be used in cooling and condensing the gas from one system. The form of headers with internal partitions and the use of two or more connections leading to and from the chambers formed by these partitions thereby permits of greater flexibility in the use of the unit.

The air on leaving the sprays 58 is passed through eliminator plates which remove any entrained moisture. By this means spray water is prevented from being carried over to and coating the high temperature coils in the passage 26.

From the foregoing it will be apparent that the present invention provides an evaporative condenser which is extremely compact in construction and a large capacity and can also be located wherever desired, connecting the air outlet 19 to discharge into a duct which may in turn discharge at any desired place. Further, it will be seen that the unit is very flexible, permitting the same unit to be used as a cooler and/or a condenser for one or more media to be cooled. It will further be seen that by the provision of the dry coils to initially bring the temperature of the medium to be cooled below 115° F. the cooler can be used to cool gases or fluids at very high entering temperatures without danger of coating the tubes while at the same time removing the bulk of the heat, particularly in condensing, in moist coils. It will also be seen that the air leaving the cooler is not saturated because the air leaving the evaporative passage 27 is mixed with the air heated in the passage 26 and which therefore has a low relative humidity. While the invention has been described as an evaporative condenser for condensing high temperature refrigerant gas from the compressor of a refrigerating system, it will be understood that the invention has a much wider field of use and also is not to be construed to be limited to the particular embodiment shown but is to be accorded the full range of equivalents comprehended by the following claims.

I claim as my invention:

1. An evaporative cooler of the character described, comprising a dry precooling coil, means for passing atmospheric air over said precooling coil, means forming a chamber, means for forcing a current of atmospheric air through said chamber, a secondary cooling coil in the current of air passing through said chamber, means for discharging water to wash the exterior of said secondary coil, means for conducting the fluid to be cooled in series through said precooling and secondary coils, means below said secondary coil for collecting the water and means for recirculating the collected water through said discharging means.

2. An evaporative cooler of the character described, comprising a dry precooling coil, means for passing atmospheric air over said precooling coil, means forming a chamber, means for forcing a current of atmospheric air through said chamber, a secondary cooling coil in the current of air passing through said chamber, means for discharging water to wash the exterior of said secondary coil, means for conducting the fluid to be cooled in series through said precooling and secondary coils, means below said secondary coil for collecting the water, means for recirculating the collected water through said discharging means and means for regulating the amount of air forced through said chamber.

3. An evaporative cooler of the character described, comprising a dry precooling coil, means for passing atmospheric air over said precooling coil, means forming a chamber, means for forcing a current of atmospheric air through said chamber, a secondary cooling coil in the current of air passing through said chamber, means for discharging water to wash the exterior of said secondary coil, means for conducting the fluid to be cooled in series through said precooling and secondary coils, means below said secondary coil for collecting the water, means for recirculating the collected water through said discharging means and means for adjusting the relative amounts of air passing over said precooling and secondary coils.

4. An evaporative cooler of the character described, comprising a dry precooling coil, means forming a chamber, means for forcing atmospheric air over said precooling coil and through said chamber, a secondary cooling coil in the current of air passing through said chamber, a nozzle arranged adjacent said secondary coil and directing water to wash the exterior of said secondary coil and evaporate thereon, means for conducting the fluid to be cooled in series through said precooling and secondary coils, means below said secondary coil for collecting the water, means for recirculating the collected water through said nozzle and means for adjusting the relative amounts of air passed over said precooling coil and through said chamber.

5. An evaporative cooler of the character described, comprising means forming a chamber, means for forcing a current of air through said chamber, a cooling coil in the current of air passing through said chamber and conducting the fluid to be cooled, means for discharging water to wash the exterior of said coil and evaporate thereon, means below said coil for collecting the water, means for recirculating the collected water through said discharging means, means for mixing a current of dry air with the current of moist air leaving said coils, and means for heating said current of dry air before admixture with said current of moist air.

6. An evaporative cooler of the character described, comprising means forming a chamber, an inlet for atmospheric air in the lower part of said chamber, a fan housed within the upper part of said chamber and withdrawing air from said chamber and discharging it through an outlet in the upper part of said chamber thereby to create an upward current of air in said chamber, a cooling coil in the current of air passing through said chamber and conducting the fluid to be cooled, means for discharging water to wash the exterior of said coil, means below said coil for collecting the water, means for recirculating the collected water through said discharging means, means for by-passing a current of air from said inlet to said fan inlet and around said coils and discharging means, and means for heating said by-passed air.

7. An evaporative cooler of the character described, comprising means providing two currents of atmospheric air, a cooling coil in one of said currents of air, a second cooling coil in the other current of air and connected in series with said first coil, means for discharging water to wash the exterior of said second coil and evaporate thereon, means below said second coil for collecting the water, means for recirculating the collected water and means for admitting the fluid to be cooled to said first coil and withdrawing it from said second coil.

8. An evaporative cooler of the character described, comprising means providing two currents of atmospheric air, a cooling coil in one of said currents of air, a second cooling coil in the other current of air and connected in series with said first coil, means for discharging water to wash the exterior of said second coil and evaporate thereon, means below said second coil for collecting the water, means for recirculating the collected water, means for admitting the fluid to be cooled to said first coil and withdrawing it from said second coil, and means for mixing said currents of air after passing said coils.

9. An evaporative cooler of the character described, comprising means forming a chamber, a partition arranged centrally in said chamber and dividing it into two passages, an inlet at one end of said chamber and an outlet at the other end of said chamber, means for forcing a current of atmospheric air into said inlet, through said passages, and out of said outlet, a cooling coil arranged in one of said passages, a second cooling coil in series with said first cooling coil and arranged in the other of said passages, means for discharging water to wash the exterior of said second coil, means below said second coil for collecting the water, means for recirculating the collected water through said discharging means and means for admitting the fluid to be cooled to said first coil and withdrawing the cooled fluid from said second coil.

10. An evaporative cooler of the character described, comprising means forming a chamber, a partition in the central part of said chamber and dividing it into two passages, an inlet and an outlet at the opposite ends of said chamber, means for forcing a current of atmospheric air into said inlet, through said passages and out through said outlet, a cooling coil arranged in one of said passages, a second cooling coil arranged in the other of said passages, an inlet header at one end of said first coil, a joint header connecting the other end of said first coil with one end of said second coil and forming a passage whereby said coils are connected in series, an outlet header at the other end of said second coil, means for discharging water to wash the exterior of said second coil, means below said second coil for collecting the water and means for recirculating the collected water through said discharging means.

11. An evaporative cooler of the character described, comprising means forming a chamber, a primary and a secondary coil in said chamber, means for passing the fluid to be cooled in series first through said primary coil and then through said secondary coil, means for passing a stream of atmospheric air over the exterior of said coils, means for discharging water over the exterior of said secondary coil to evaporate thereon and means for isolating said discharging means and secondary coil to prevent entrained water from being carried over to the primary coil including means in the path of the air leaving said secondary coil and removing the entrained water therefrom.

12. An evaporative cooler of the character described, comprising means forming a primary and a secondary chamber, a primary coil in said primary chamber, a secondary coil in said secondary chamber, means for passing the fluid to be cooled in series first through said primary coil and then through said secondary coil, means for passing a stream of atmospheric air over the exterior of said coils, means for discharging water into said air stream and bringing said water into contact with one of said coils and eliminator plates in the path of the air leaving said discharging means and interposed between said chambers to remove entrained water therefrom and prevent such entrained water from being carried over to the other coil.

CHARLES N. DEVERALL.